United States Patent
Kessler et al.

(10) Patent No.: US 8,766,136 B2
(45) Date of Patent: Jul. 1, 2014

(54) LASER WELDING TOOL

(75) Inventors: Berthold Kessler, Burbach (DE); Heribert Heinz, Burbach (DE)

(73) Assignee: IPG Photonics Corporation, Oxford, MA (US)

(*) Notice: Subject to any disclaimer, the term of this patent is extended or adjusted under 35 U.S.C. 154(b) by 145 days.

(21) Appl. No.: 13/016,620

(22) Filed: Jan. 28, 2011

(65) Prior Publication Data

US 2011/0278265 A1    Nov. 17, 2011

(51) Int. Cl.
*B23K 26/20*    (2014.01)
*B23K 26/10*    (2006.01)

(52) U.S. Cl.
USPC ............ 219/121.63; 219/121.82; 219/121.62

(58) Field of Classification Search
USPC ............... 219/121.63, 121.64, 121.78–121.8, 219/121.84, 121.82
See application file for complete search history.

(56) References Cited

U.S. PATENT DOCUMENTS

| | | | | |
|---|---|---|---|---|
| 5,650,077 | A | * | 7/1997 | Zinke ...................... 219/121.64 |
| 6,011,240 | A | * | 1/2000 | Bishop et al. ............ 219/121.63 |
| 6,579,626 | B1 | * | 6/2003 | Ottinger et al. ............... 428/626 |
| 7,918,845 | B2 | * | 4/2011 | Saadat et al. ...................... 606/1 |
| 2003/0213786 | A1 | | 11/2003 | Baker |
| 2007/0119829 | A1 | | 5/2007 | Vietz |

FOREIGN PATENT DOCUMENTS

| | | | |
|---|---|---|---|
| CN | 1137430 | A | 12/1996 |
| CN | 1890049 | A | 1/2007 |
| CN | 1895833 | A | 1/2007 |
| CN | 1895834 | A | 1/2007 |
| CN | 101032786 | A | 9/2007 |
| CN | 101204756 | A | 6/2008 |
| DE | 29621281 | U1 * | 1/1997 |
| JP | 58053384 | A | 3/1983 |
| JP | 62084888 | A * | 4/1987 |
| JP | 06015471 | | * 1/1994 |
| JP | 06015471 | A | 1/1994 |
| JP | H04-177034 | | 1/1994 |
| JP | 07032177 | A | 3/1995 |
| JP | 2004306057 | A | 4/2004 |

OTHER PUBLICATIONS

The State Intellectual Property Office of the People's Republic of China, Notification of the First Office Action in regards to Application No. 200980129981.4. Dated Mar. 21, 2013.
International Search Report in regards to PCT/EP2009/059831 mailed Nov. 11, 2009.

* cited by examiner

*Primary Examiner* — Samuel M Heinrich
(74) *Attorney, Agent, or Firm* — Yuri Kateshov, Esq.; Tim King, Esq.

(57) ABSTRACT

A welding tool is configured with a housing enclosing a fiber laser system which is operative to produce a weld seam for connecting two workpieces. The fiber laser system includes a focusing optic configured to focus the output beam of the system so that it propagates through an elongated slit formed in the bottom of the housing. The fiber laser system is capable to move along a predetermined path extending parallel to the longitudinal direction of the slit and limited by the perimeter thereof. The output beam is generated only when the slit sits upon at least one of the workpieces.

10 Claims, 3 Drawing Sheets

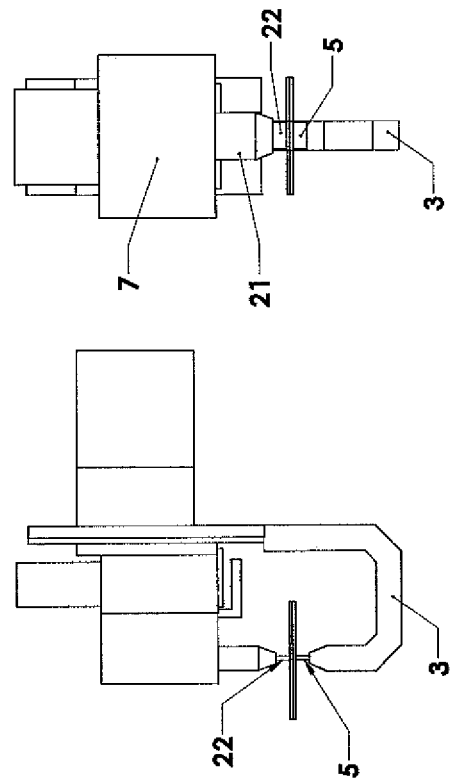
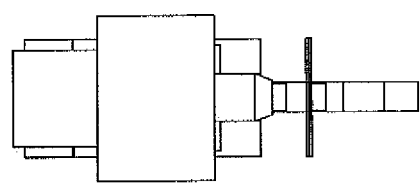
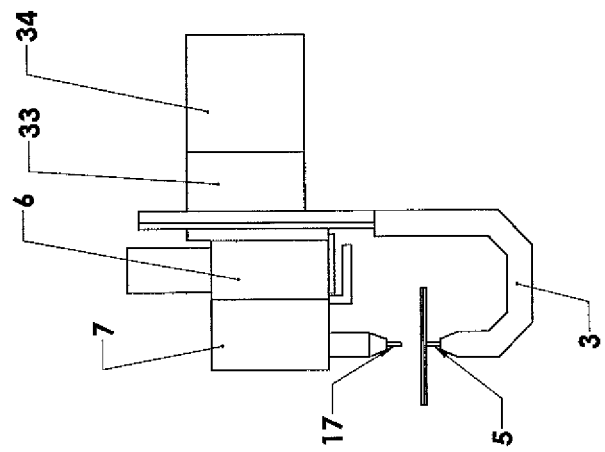
Figure 2a
Figure 2b

LASER WELDING TOOL

PRIORITY CLAIM

This application claims priority from a PCT/EP2009/059831 based on a German Patent application 08104923.1 with a filing date Jul. 30, 2008.

BACKGROUND OF THE DISCLOSURE

1. Field of the Disclosure

The disclosure relates to a laser welding tool for producing a weld seam to join work pieces wherein the laser beam can be moved along the weld seam using a linear drive.

2. Prior Art Discussion

Resistance welding is still the dominant process used in the automotive industry mostly using robot-guided welding tongs. Resistance welding is a welding process for electrically conductive materials based on the Joule heat of an electric current flowing through the joint. The Joule effect heats the work pieces to be joined until they melt. The welded joint is created when the molten material re-solidifies. The work pieces to be joined are usually pressed together using welding tongs during and after the current flow, which helps generate a homogeneous joint. Laser beam welding is gaining importance as an alternative process. Laser beam welding is mostly used for welding work pieces together that have to be joined with a narrow weld seam and low thermal delay. Like resistance welding, laser beam welding or laser welding is performed without adding another material.

The work piece surfaces of the abutting edges or the abutment of the work pieces to be welded is in the immediate vicinity of the focus of the collimator that is also called the cross-over point in laser beam welding. The typical diameter of the cross-over point is between 0.5 and 1.0 mm, which produces very high energy concentrations. As it absorbs the laser output, temperatures on the work piece surface rise extremely fast above the melting temperature of the metal so that a melt is formed. However, the advantages of laser beam welding are put into perspective by high acquisition costs, low efficiency and a considerable outlay for safety equipment. In addition, the gas or solid-state laser welding apparatuses currently used in industrial applications have fairly large dimensions and are not suitable for use in the automotive industry. An example of a laser welding system wherein the laser beams can be moved along a weld seam using a linear drive is known, for example, from JP 2004-243393.

A need therefore exists for a fiber laser welding tool that can be integrated into existing infrastructures for resistance welding and in particular facilitates the continued use of existing component tools and handling equipment for welding tools.

A further need exists for a fiber laser welding tool that ensures the required safety of people at a laser welding output typical for automotive applications (up to 2 kW) and reduces design-related disadvantages of industrial welding tools, in particular high acquisition costs, poor efficiency, and considerable expenses for safety equipment.

SUMMARY OF THE DISCLOSURE

These needs are satisfied by the disclosed fiber laser that includes a delivery fiber, an optic for coupling the laser radiation from a radiation source into the fiber and a collimator connected to the fiber for focusing the path of the laser beams. The collimator is arranged on the linear drive that facilitates movement thereof along a predetermined line of motion. The linear drive and the collimator are provided in a housing having an exit slit for the laser beams, wherein the line of motion of the collimator runs in parallel to the exit slit. The collimator is orientated such that the laser beams exclusively exit from the housing through the exit slit and the laser beam can only be activated when the exit slit of the housing sits upon one of the work pieces.

Use of fiber lasers with compact dimensions and flexibly designable laser sources allows integration of the laser welding tools into the infrastructure of conventional resistance welding systems for the automotive industry. Using the fiber for light guidance, the laser radiation can thus be conducted like over a cable to where the weld seam is to be produced such that laser welding can be performed in confined spaces as are often encountered in the automotive industry. At the same time, fiber lasers are characterized by a higher beam quality as compared to gas and solid-state lasers, improved efficiency of currently 30 percent, lower costs of maintenance and also lower acquisition costs.

To ensure the required safety level for people when producing the weld seams by the amplified signal light, whether these are continuously or spot-welded, the position of the collimator is so controlled that the laser beam can only exit from the housing through the exit slit. In addition, the laser output of the fiber laser is activated only when the exit slit sits upon the work piece. By combining these measures, the weld seam can be produced along the predetermined line of motion and without the laser welding tool putting people in the working environment of the robot at risk of being harmed, even if the tool is mounted on a robot arm. Obstruction of the welding process by the housing edges is mainly prevented if the housing is tapered towards the exit slit.

Conventional resistance welding systems in the form of spot-welding tongs are typically moved by a welding robot in the automotive industry. To maintain these operating processes without change, the laser welding tool is preferably configured as welding tongs with a holder, a C-shaped lower tool attached to the holder, and a traversing unit that moves the housing relative to the holder, wherein a pressure piece is arranged in alignment with the free end of the lower tool and the pressure piece and the exit slit that is in alignment with it can be moved together and apart using the traversing unit. The pressure piece forms the thrust bearing during the force-driven approximation of the housing and lower tool. Optimized load transmission when the welding tongs collapses is achieved by matching the pressure piece to the shape of the exit slit.

For modular design and cost reduction of the laser weld tool according to the disclosure, the traversing unit comprises an actuator mounted to the holder, a receptacle for the housing, and a linear guide for the housing receptacle. Preferably, the housing receptacle is configured such that various housings can be installed on the housing receptacle in a short time. Adjustment to different welding conditions is therefore easily possible.

The housing includes at least a collimator, the linear drive associated with the collimator, and the especially funnel-shaped enclosure of the laser beam. For smooth movement of the collimator and the laser beam and exact control of starting travel and maintaining specified collimator positions, the linear drive for the collimator comprises a single-axis linear carriage that is connected to the actuator. The actuator is typically configured as a servomotor. Electric and hydraulic motors are suitable.

A particular switching element provided on the housing switches the power supply of the fiber laser on when the exit slit is sitting on one of the work pieces and thus activates the fiber laser in that position. The switching element can be a contact directly adjacent to the exit slit, a sensor element, or a pushbutton. Alternatively, a movable part of the housing that includes the exit slit can also function as a switching element.

To quickly bring the opened laser welding tongs in position on the work pieces to be welded using a robot, the holder in a preferred embodiment of the disclosure is arranged on a compensating module that allows minor compensatory movements of the holder relative to a robot arm for moving the laser welding tool. When the tool travels to the welding position, the pressure piece of the lower tool is at a defined, distance from one of the work pieces, for example, 2 to 3 mm. The exit slit of the laser module will be, for example, 150 mm away from the work piece to be welded when the welding tongs is open. Only after moving into the welding position, first the lower tool and then the housing (upper tool) are brought into contact on the work pieces using the compensating module. Slightly varying positions of the work pieces to be welded with respect to a defined welding position of the welding tongs do therefore not pose a problem for traveling into welding position.

For constant floating alignment of the lower tool of the laser welding tool to the work piece without changing the position of the work piece, one embodiment of the disclosure contemplates that the compensating module comprises a compensating base to be mounted to a robot arm, that a linear guide for the holder arranged for the same direction of travel as the linear guide of the housing receptacle is arranged on said compensating base, and that the compensating module comprises a short-stroke linear motor that acts on the holder and has a spring-driven unit incorporated into its linear-acting flow of force.

In one embodiment of the disclosure, a wobble generator that can be moved along the predetermined line of motion is arranged between the collimator and a supporting member of the linear drive to produce a wider weld seam. A wobble generator (also called a wobblers) is an electronic device for generating wobbles wherein the frequency generated varies cyclically between end values that can be set. The wobbles may be generated, for example, by electromagnetic, electromotive, or piezoelectric means. Controlled triggering of the wobble generator allows the collimator to perform an oscillating motion at variable amplitudes and frequencies perpendicular to the predetermined line of motion. The supporting member of the wobble generator may for example be a traveling base plate.

BRIEF DESCRIPTION OF THE DRAWINGS

The disclosure will be explained in more detail below with reference to the figures. Wherein:

FIG. 2a is a lateral view and a top view of an opened laser welding tongs according to FIG. 1

FIG. 2b is a lateral view and a top view of an closed laser welding tongs according to FIG. 1.

SPECIFIC DESCRIPTION

Figure 1B:
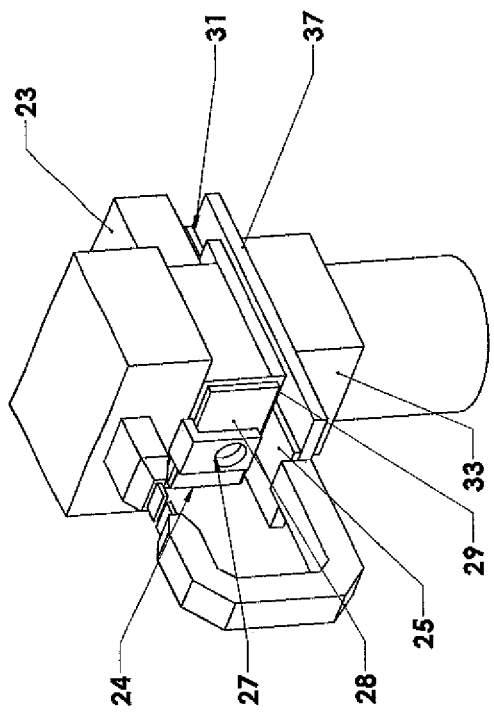
FIG. 1b shows a laser welding tongs as in FIG. 1a in its closed state
Figure 1A:
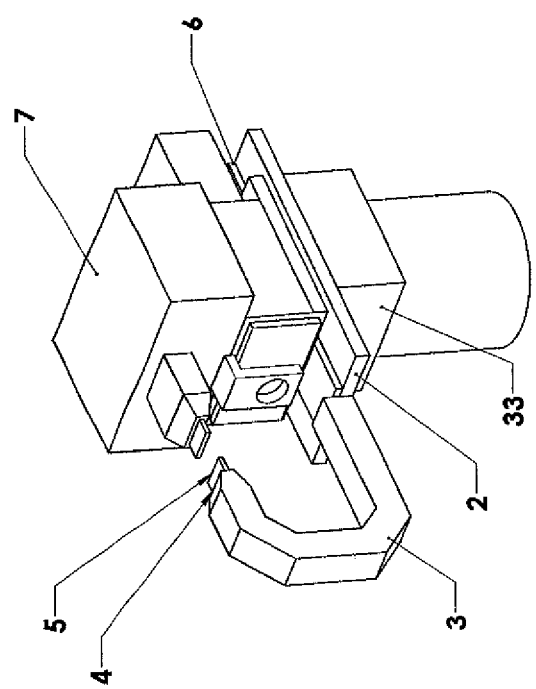
FIG. 1a is a perspective view of a laser welding tongs according to the disclosure in its open state.

FIG. 1a shows a laser welding tongs 1 with a holder 2 configured as a plate, a generally C-shaped lower tool 3 arranged on the holder 2, with a pressure piece 5 mounted to the free end 4 of the lower tool 3. A traversing unit 6 is arranged on the holder 2 and moves the laser module referenced as a whole as 7 into the direction of the pressure piece 5 or away from it.

Figure 3:
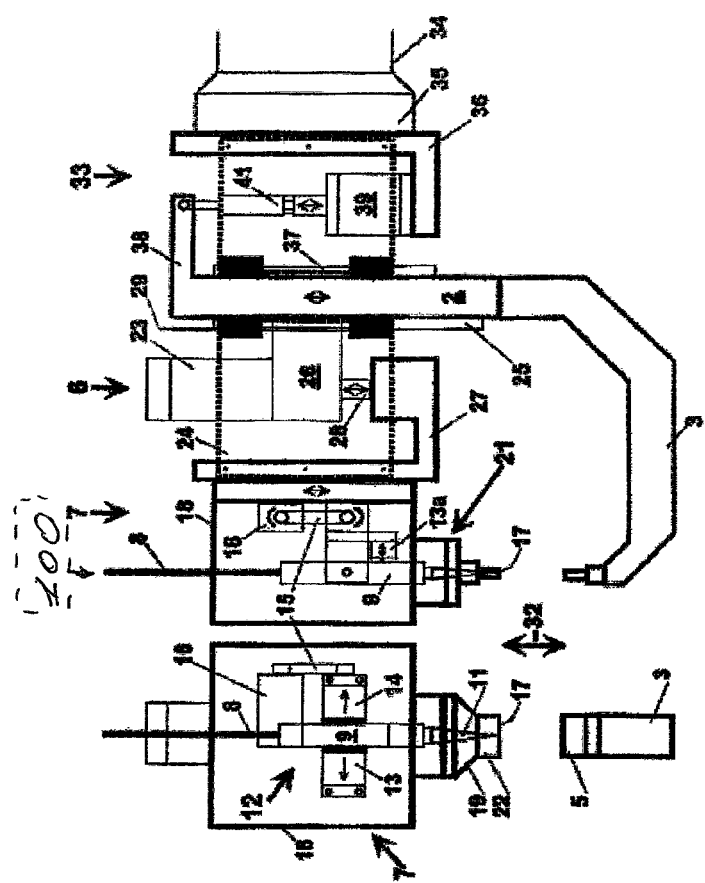
FIG. 3 is a diagrammatic view of the operating principle of a laser welding tongs according to FIGS. 1 and 2.

FIG. 3 illustrates the design and operating principle of the laser module 7, which is configured to as a fiber laser. The pump radiation is coupled into a fiber 8 by means of focusing optics, which is not shown, but well known to one of ordinary skills in the art. The laser module includes a collimator 9 receiving the fiber 8 for focusing the laser radiation 11 which is emitted by a fiber laser source 100 and coupled into the fiber 8. The linear drive 12 for the collimator 9 comprises a linear carriage 14 that can be moved along the only axis 13 and, in the embodiment shown, is connected to an actuator 16 such as a servomotor via a belt and chain drive 15. The linear drive 12 with the collimator 9 including a portion of the fiber 8 are arranged in a housing 18 comprising an exit slit 17 for the laser radiation 11 that tapers like a funnel towards the exit slit 17 in a section 19 of a housing extension 21. The laser radiation 11 is fully enclosed in the housing 18, particularly its extension 21 with the funnel-shaped section. This ensures that the laser radiation 11 can only exit from the exit slit 17.

The laser energy for activating the fiber laser is activated by a pressure piece 22 located at the front end of the tapering section 19 in the following manner. When tapering section 19 abuts one of the work pieces, a power circuit of the laser system is closed which causes the generation of laser radiation. In addition, the power circuit activation can be made dependent on the buildup of a sufficient pressure force between the pressure pieces 5 and 22 of respective tool 3 and housing 18 which are positioned in alignment with one another. The force is measured by force sensors in the flow of force of the tongs, e.g. on or in the extension of the lower tool 3.

Referring to FIG. 1b in addition to FIG. 3, the traversing unit 6 comprises an actuator 23 in form of a servomotor attached to the holder 2, a housing receptacle 24, and a linear guide 25 configured as a guide rail for the housing receptacle 24. The actuator 23 is attached by means of a bracket 26 (FIG. 3) to the holder 2.

As can be seen from FIG. 1b, the housing receptacle 24 is configured as a rectangular profile, and a fixing bracket 27 onto which a drive shaft 28 of the servomotor 23 acts is attached to its front end that faces the lower tool. Guide elements 29 are provided on the bottom side of the housing receptacle 24 and engage in corresponding grooves 31 of the guide rail 25. The laser module 7 can be moved along a freely programmable path 32 up to the work piece using the actuator 23 of the traversing unit 6.

Returning to FIG. 3, a compensating module 33 that can be moved relative to the holder 2 is arranged on the bottom side of the plate-shaped holder 2 and allows slight compensatory movements of the holder 2 relative to a robot arm 34. The robot arm (34) is connected via a quick-connector flange 35 to the compensating module 33 of the welding tongs 1.

The compensating module 33 is configured with a compensating base 36 having a linear guide 37 for the holder 2 and attached to the quick-connector flange 35. The linear guide 37 allows the same direction of movement as the linear guide 25 of the housing receptacle 24.

A fastening flange 38 is provided on the end of the lower tool 3 opposite the holder 2. A short-stroke cylinder 39 that acts on the holder 2 and a spring-pressure unit 41 are inserted between the fastening flange 38 and the compensating base 36. The spring pressure unit 41 is integrated into the piston rod of the short-stroke cylinder 39 such that the linear-acting flow of force is not impaired. For this purpose, a compression spring encompassed by a sleeve can be integrated as a spring-pressure unit into the piston rod.

FIGS. 2a and 2b illustrate the operating mode of the laser welding tongs 1 and the compensating module 33. FIG. 2a shows how the opened laser welding tongs 1 held by the robot arm 34 of a robot is brought into position at work pieces 10 to be joined. The lower tool 3 that is attached to the holder 2 will be at a defined distance 42 from the work piece of, for example, 2 to 3 mm when the compensating module 33 is not activated. This distance 42 is selected to allow the robot to move fast into welding position at any time, taking into account any work piece position variations. The distance 43 of the laser module 7 from the work piece can be freely programmed within the overall stroke of the traversing unit 6 and may, for example, be 150 mm.

The closing function of the laser welding tongs 1 is started when the laser welding tongs 1 are positioned at the work pieces 10. Initially, the compensating module 33 is activated by activating the short-stroke cylinder 39 (FIG. 3) that presses the lower tool 3 with the pressure piece 5 with a defined force against the work piece 10. This force is dimensioned such that the lower tool 3 aligns in a floating manner with the work piece but without changing the position of the work piece. If the position of work piece 10 varies, the spring-force unit 41 will ensure floating alignment by a defined force. The traversing unit 6 is started at the same time as the compensating module 33 is activated. Due to the greater distance 43 from the work piece 10, the laser module with the exit slit 17 comes to rest against the work piece 10 somewhat later when the traveling speed is the same. While the tongs closes, the pressure piece 5 of the lower tool 3 and the pressure piece 22 (FIG. 2b) of the laser module 7 come to rest in alignment on the work pieces 10. The welding process can only start after the pressure piece 22 of the laser module 7 sits upon the work piece.

As the collimator 9 moves along the linear carriage 14, the laser beam 11 that is focused towards the exit slit 17 moves in parallel to the line of motion 13 of the collimator. A continuous or spot-welded seam can be laid along length of the exit slit onto the surface section of the work piece 10 around the exit slit 17.

For laying a wider weld seam, a wobble generator 13a (FIG. 3) may be arranged between the collimator 9 and the supporting member of the linear carriage 14 that can be moved along the predetermined line of motion 13. The wobble generator 13a generates wobbles of the collimator 9 that is pivoted about an axis of rotation. The axis of rotation extends in parallel to the traversing path 13 of the collimator 9. The wobbles cause the laser beam 11 on the exit slit 17 to oscillate at an amplitude matching their width, producing a weld seam that is up to 2 mm wider.

Although shown and disclosed is what is believed to be the most practical and preferred embodiments, it is apparent that departures from the disclosed configuration will suggest themselves to those skilled in the art. Accordingly, the present invention is not restricted to the particular constructions described and illustrated, but should be construed to cohere with all modifications that may fall within the scope of the appended claims.

The invention claimed is:

1. A laser welding tool for welding together work pieces, comprising:
    a housing receptacle;
    an elongated housing provided with an exit slit and mounted to the housing receptacle so as move relative thereto towards and away from the work pieces to be welded along a longitudinal axis;
    a fiber laser system including a collimator displaceable with the housing along the longitudinal axis and movable independently therefrom along a linear path perpendicular to the longitudinal axis, the collimator receiving a downstream end of a laser beam delivery fiber and operative to direct the laser beam through the exit slit;
    a sensor operative to detect contact between the housing and at least one of the work pieces to be welded and activate the fiber laser system upon detecting the contact.

2. The laser welding tool of claim 1, wherein the housing is configured with a funnel tapering towards a bottom thereof having the exit slit.

3. The laser welding tool of claim 2 further comprising
    a first pressure piece coupled to the bottom of the funnel and having a bottom edge which defines the exit slit, the slit having a longitudinal axis parallel to the linear path,
    a holder,
    a second pressure piece on the holder,
    a lower tool supported on the holder, and
    a traversing unit operative to axially displace the housing and holder relative to one another so that the first and second pressure pieces are displaceable towards and away from each other.

4. The laser welding tool of claim 3, wherein the traversing unit comprises an actuator mounted to the holder, a housing receptacle, and a linear guide configured to guide the housing receptacle.

5. The laser welding tool according to claim 1, wherein the fiber laser system is further configured with a linear actuator mounted in the housing, a carriage coupled to and displaceable by the linear actuator along the linear path and coupled to the collimator.

6. The laser welding tool of claim 3 further comprising a compensating module supporting the holder and configured to provide for compensating movements of the holder relative to a robot arm for moving the laser welding tool.

7. The laser welding tool according to claim 6, wherein the compensating module has a base coupled to the robot arm, a linear guide mounted on the base and operative to displace the holder, a short-stroke linear motor coupled to the holder and provided with a spring-driven unit.

8. The laser welding tool of claim 1 further comprising a wobble generator mounted in the housing and coupled to the fiber laser system so as to produce a generally sinusoidal seam along the linear path, the wobble generator being configured so that the collimator rotates about a rotation axis parallel to the longitudinal axis of the exit slit and provides the sinusoidal seam with an amplitude matching a width of the exit slit as the collimator moves along the linear path.

9. The laser welding tool of claim 1, wherein the collimator terminates within the housing at a distance from the exit slit, so that the laser beam propagates through free space between the collimator and ext slit.

10. The laser welding system of claim 1, wherein the fiber laser system further includes a fiber laser operative to emit the laser beam coupled into the delivery fiber.

* * * * *